United States Patent
Barry et al.

(10) Patent No.: US 8,255,664 B2
(45) Date of Patent: *Aug. 28, 2012

(54) METHODS AND APPARATUS FOR ADDRESS TRANSLATION FUNCTIONS

(75) Inventors: Edwin Franklin Barry, Vilas, NC (US); Gerald George Pechanek, Cary, NC (US)

(73) Assignee: Altera Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/105,050

(22) Filed: May 11, 2011

(65) Prior Publication Data

US 2011/0213937 A1    Sep. 1, 2011

Related U.S. Application Data

(63) Continuation of application No. 10/815,294, filed on Apr. 1, 2004, now Pat. No. 7,945,760.

(51) Int. Cl.
    *G06F 12/00*    (2006.01)
(52) U.S. Cl. ..................................... 711/202
(58) Field of Classification Search .................. None
    See application file for complete search history.

(56) References Cited

U.S. PATENT DOCUMENTS

| | | | | |
|---|---|---|---|---|
| 5,361,367 A * | 11/1994 | Fijany et al. | .................... | 712/15 |
| 6,446,190 B1 * | 9/2002 | Barry et al. | .................... | 712/24 |
| 6,519,696 B1 * | 2/2003 | Henry et al. | .................. | 712/222 |
| 6,823,505 B1 * | 11/2004 | Dowling | ........................ | 717/140 |
| 6,944,747 B2 * | 9/2005 | Nair et al. | ........................ | 712/35 |
| 7,076,635 B1 * | 7/2006 | Butler et al. | .................. | 711/213 |

* cited by examiner

*Primary Examiner* — Duc Doan
(74) *Attorney, Agent, or Firm* — Law Offices of Peter H. Priest, PLLC

(57) ABSTRACT

Techniques are described for efficient reordering of data and performing data exchanges within a register tile or memory, or in general, any device storing data that is accessible through a set of addressable locations. In one technique, an address translator is placed in the path of all or a selected set of address busses to a storage device to provide a programmable and selectable means of translating the storage device addresses. An effect of this translation is that the data stored in one pattern may be accessed and stored in another pattern or accessed, processed and stored in another pattern. The address translation operation may be carried out in a single cycle, does not involve the physical movement of data in swap operations, allows data to effectively be ordered more efficiently for algorithmic processing and therefore saves power. Address translation functions are shown to be useful for vector operations and a new type of storage unit using built in address translation functions is presented.

9 Claims, 13 Drawing Sheets

FIG. 10A

|     |     |     |     |
| --- | --- | --- | --- |
| 0,0 | 0,1 | 0,2 | 0,3 |
| 1,0 | 1,1 | 1,2 | 1,3 |
| 2,0 | 2,1 | 2,2 | 2,3 |
| 3,0 | 3,1 | 3,2 | 3,3 |

MATRIX 4
1004

DATA IN i,j ORDER

00000 → 0,0
00001 → 0,1
00010 → 0,2
00011 → 0,3
00100 → 1,0
00101 → 1,1
00110 → 1,2
00111 → 1,3
01000 → 2,0
01001 → 2,1
01010 → 2,2
01011 → 2,3
01100 → 3,0
01101 → 3,1
01110 → 3,2
01111 → 3,3

1008 TABLE

FROM FIG. 10A

|     |     |     |     |
| --- | --- | --- | --- |
| 0,0 | 1,0 | 2,0 | 3,0 |
| 0,1 | 1,1 | 2,1 | 3,1 |
| 0,2 | 1,2 | 2,2 | 3,2 |
| 0,3 | 1,3 | 2,3 | 3,3 |

MATRIX 5
1024

DATA IN j,i ORDER

00000 → 0,0
00001 → 1,0
00010 → 2,0
00011 → 3,0
00100 → 0,1
00101 → 1,1
00110 → 2,1
00111 → 3,1
01000 → 0,2
01001 → 1,2
01010 → 2,2
01011 → 3,2
01100 → 0,3
01101 → 1,3
01110 → 2,3
01111 → 3,3

1028 TABLE

METHODS AND APPARATUS FOR ADDRESS TRANSLATION FUNCTIONS

The present application is a continuation of and claims the benefit of and priority to U.S. Ser. No. 10/815,294 filed Apr. 1, 2004 which is incorporated herein by reference in its entirety.

FIELD OF THE INVENTION

The present invention relates generally to improvements in signal processing systems, and more particularly to advantageous techniques for instruction execution to include translating storage device addresses prior to data access.

BACKGROUND OF THE INVENTION

Signal processing systems, including those for video, audio and graphics, for example, use interface paths to transmit data from a media source or sources and/or a high capacity storage medium to a signal processing subsystem. The data received in the signal processing subsystem will typically be stored locally in a number of different patterns. From this local storage, the data will be accessed for algorithmic processing. These data patterns may not be in the best order for efficient algorithmic processing. In addition, when processing the data with a series of algorithms, each algorithmic stage of processing may produce results in a pattern that is not in an efficient order for the next stage of processing. The result is that a considerable amount of time can be spent by the processing system reordering data to fit the algorithms that are used. This inefficiency causes a loss in performance and an increase in power utilization.

There are many signal analysis techniques that make use of matrix and data sorting operations and could make advantageous use of data swapping or exchange type operations. In a processor, a swap operation can be specified to read the contents of two registers and then write the data values to the swap address. For efficient programming when using register files or local memories, it can be advantageous to additionally provide the ability to swap contents of groups of locations. For example, swapping a block of data, providing the transpose of a matrix stored in either registers or memory, implementing permutations on a set of registers, and the like, are all examples of algorithmic capabilities which are desirable to efficiently support.

SUMMARY OF THE INVENTION

Among its several aspects, the present invention describes methods and apparatus for efficient reordering of data and performing data exchanges within a register file or memory or, in general, devices storing data that is accessible through a set of addressable locations. The present invention addresses problems, such as those noted above, while achieving a variety of advantages as discussed in further detail below. In one aspect of the present invention, an address translator is placed in the path of all or a selected set of address buses to a storage device to provide a programmable and selectable arrangement for translating the storage device addresses.

The address translator may provide support for many permutation operations to be carried out on the order of the data resident in the storage device. The effect of this translation is that data stored in one pattern may be accessed and stored in another pattern or accessed, processed and stored in another pattern. In one aspect of the present invention, a processor system specifies input operands to be selected from translated addresses, result operands to be stored at translated addresses, or both of these types operations to occur together as defined by a processor instruction. The address translation operation may be carried out in a single processor cycle and need not involve the physical movement of data in swap operations which allows data to, in effect, be ordered more efficiently for algorithmic processing and therefore saves power.

In another aspect of the present invention, the address translator can be specifically designed for a single type of address translation function, or it may be designed more generally to support multiple address translation functions. In a further aspect of the present invention, exemplary instructions for effectively using the address translation facility of the hardware are presented. In addition, address translation functions, in accordance with the invention, are shown to be useful in vector operations supporting flexible capabilities for efficient processing. Further, a new type of storage unit using built in address translation functions is also described herein.

These and other features, aspects and advantages of the invention will be apparent to those skilled in the art from the following detailed description taken together with the accompanying drawings.

BRIEF DESCRIPTION OF THE DRAWINGS

FIG. 10A illustrates a 4×4 organization of data stored in memory in i,j order; and FIG. 10B illustrates a transpose of the 4×4 organization of data stored in memory in j,i order in accordance with the present invention.

DETAILED DESCRIPTION

The present invention now will be described more fully with reference to the accompanying drawings, in which several presently preferred embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

Figure 1:
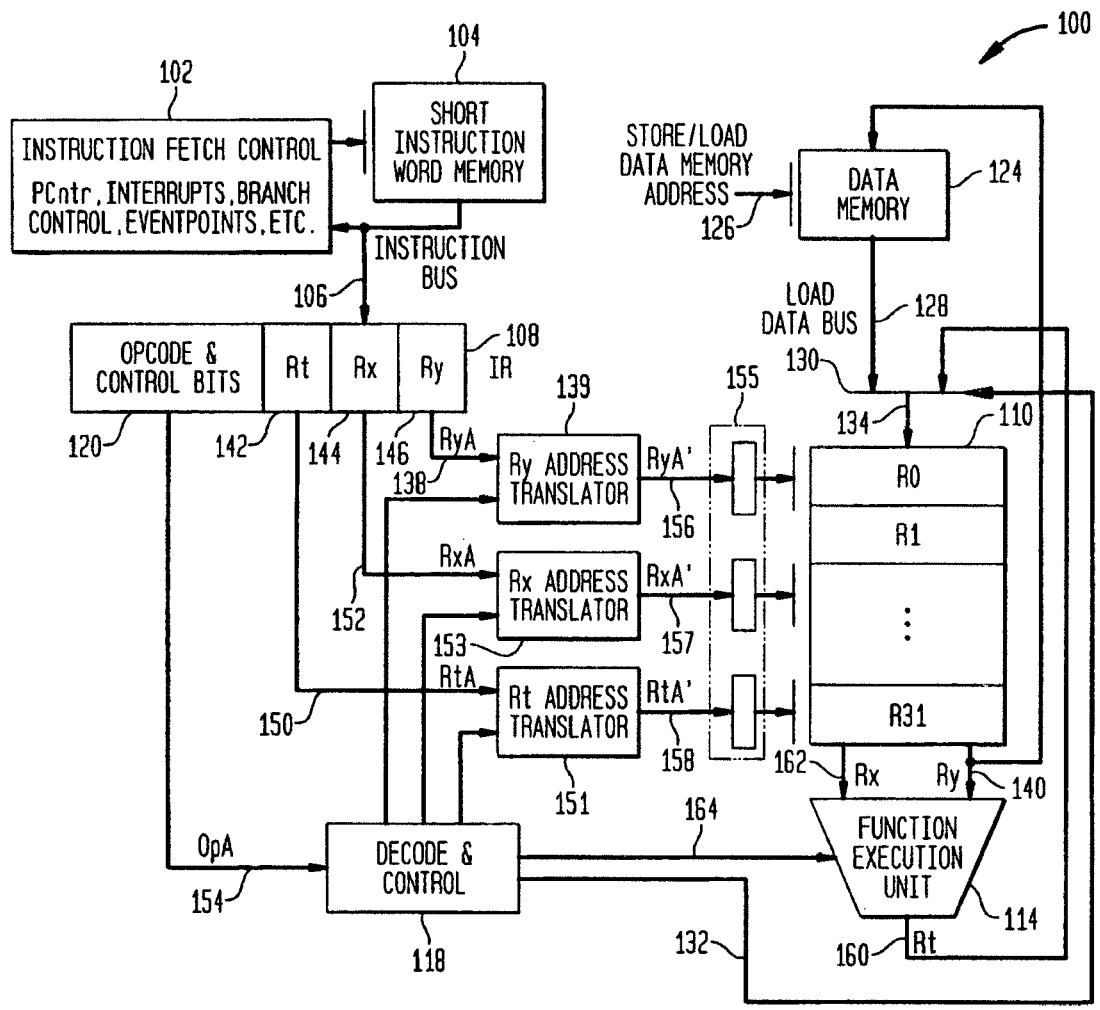
FIG. 1 illustrates an exemplary processor showing a logical data flow using address translators in operand address paths for direct operand addressing instructions in accordance with the present invention.

FIG. 1 illustrates an exemplary processor 100 showing a logical data flow using address translators 139, 151, and 153 in operand address paths for direct operand addressing instructions. The processor uses a fetch, decode, and execute pipeline and has an instruction fetch control unit 102 that includes a program counter (PCntr), instruction memory address generation components, support for interrupts, branch control, eventpoints, and other suitable subsystems. The instructions fetched are decoded during a decode stage to determine the operations required by the instructions and also determines the operand addresses of data to be operated on that are stored in a storage device, such as a register file or memory. The instruction specified operations are accomplished during the execute stage of the pipeline.

During the fetch stage, the instruction fetch control unit 102 generates an address, based on the PCntr, to a short instruction word (SIW) memory 104 that contains SIWs in order to fetch an instruction over instruction bus 106. The fetched instruction is stored in instruction register (IR) 108. The processor 100 includes a storage device such as a register file 110 accessible by a function execution unit 114. A decode and control unit 118 decodes the opcode and control bits 120 of the instruction stored in the IR 108. Further, the operation of the function execution unit 114 and the timing and control signals for the register file accessing and associated multiplexers are controlled by the decode and control unit 118.

Instructions received into the IR 108 may include load, store, control, arithmetic, and similar type instructions. With a load instruction, data is read from data memory 124, at an address 126 generated from information contained in the instruction in the IR and may be a translated address. For sake of simplicity of illustration, the store and load data memory address generation components and address path are not shown. Rather, the address generation components and operation are described for operand addresses to the processor's register file. It is noted that similar techniques may be used for data memory addressing such as for the data memory 124. Once a data memory address has been generated, the data, read from data memory 124, is provided to load data bus 128. The addressed data is passed through multiplexer 130, as selected by the write data path selector signal 132, to the write port 134 of register file 110 for writing the selected data into the register file 110 at a register file target address specified by the load instruction either directly or in translated form as described further below.

With a store instruction, data is read from register file 110, at an address RyA' 156 that is a translation of Ry 146 from the store instruction in the IR 108 applied to address bus RyA 138 as input to address translator 139 or is passed through address translator 139 and used directly. The data, read from register file 110, is provided to register file read data port 140 connected to the write port of data memory 124 for writing the selected data into the data memory 124 at an address 126 that may be a translated address. For purposes of clearly describing the present invention, only load, store, and arithmetic instructions are described in further detail.

An arithmetic instruction received in the IR 108 may contain, for example, three register file address fields, Rt 142, Rx 144, and Ry 146 that are supplied over RtA bus 150, RxA bus 152, and RyA bus 138 where address translators 151, 153 and 139, respectively, are located in the three operand address paths. Each operand address is five bits to allow full addressing range for the thirty two entry register file 110. The opcode and control bits are supplied over OpA bus 154 to the decode and control unit 118. Logically, the register file 110 read and write ports have associated port address inputs that are latched in port address registers 155 that are part of a decode register at the end of the decode stage of processor 100. The output of the address translators RyA' 156, RxA' 157, and RtA' 158 are latched and then provided to the address inputs to the register file 110. The address translation occurs on each data transfer to or from the register file as specified by the instruction in IR 108. The read data ports Rx 162 and Ry 140 provide input data to the function execution unit as specified by control signals 164 from the decode and control unit 118. The function execution unit 114 produces a result output Rt 160 that is one of two data paths that share the register file's 110 write port 134 through multiplexer 130.

Figure 2A:
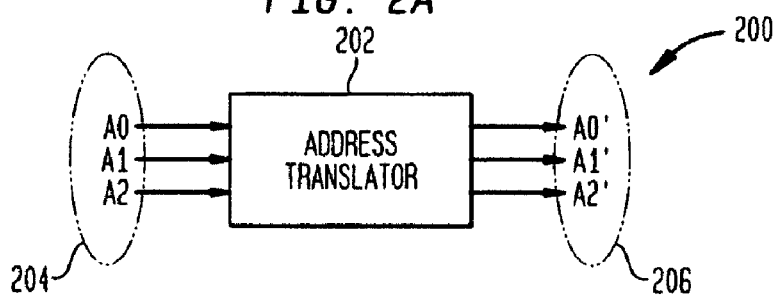
FIG. 2A illustrates a 3-bit address translator with a complement bit A2 function in accordance with the present invention.

FIG. 2A illustrates an addressing subsystem 200 comprising an address translator 202 with address inputs 204 and outputs 206 for use in addressing eight locations requiring only three address lines. The exemplary three bit address subsystem 200 is a subset of the five bit address subsystems used for each operand address in the processor 100 of FIG. 1. As an example, the address translator 202 can be described by way of an exemplary block exchange of four registers. Three address bit inputs 204, A0, A1, and A2, are the inputs of the address translator 202. In this block exchange example, the address translator 202 operates to complement address bit 2 (A2) so that translator 202 produces on its outputs 206, A0', A1', and A2' the translated values as follows A0'=A0, A1'=A1 and A2'=$\overline{A2}$, where $\overline{A2}$ indicates that a value applied to the input address line A2 is complemented.

Figure 2B:
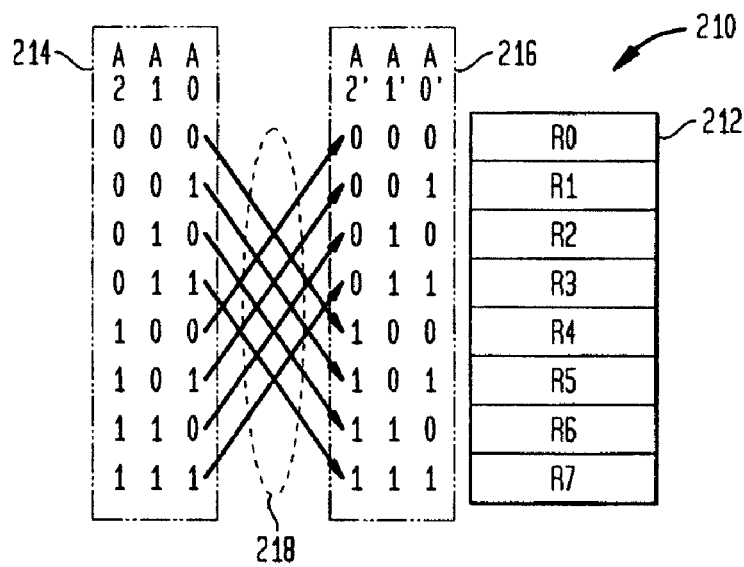
FIG. 2B illustrates an address translation operation where the address line A2 is complemented in accordance with the present invention.

FIG. 2B shows a storage device 210, such as a register file or small memory, containing eight physical data storage locations 212 with addresses A0', A1', and A2', 000 to 111 in a binary order as table 216. Associated with these addresses 000-111 are location names R0-R7, respectively. For example, when address 000 is used implicitly or explicitly as an operand address by an instruction, the programmer assumes that R0 is accessed, and when address 101 is used by an instruction, it is assumed that R5 is accessed. Address inputs A0, A1, and A2, 000-111, in table 214 are inputs to an address translator component indicated by oval 218. As seen in FIG. 2B, an access to address A0, A1, A2 of 000 is converted to an A0', A1', A2' value of 100 (R4) and all accesses to A0, A1, A2 of 100 are converted to an A0', A1', A2' value of 000 (R0). In effect, the registers R0 and R4 have been exchanged. All other registers are exchanged in like fashion as illustrated in FIG. 2B. The address translator 202, as indicated by the dashed oval 218 for convenience, operates to complement address line A2 and pass the other address lines, A0 and A1, through. As can be seen by the arrows, each address input is translated to its new address value.

Figure 2C:
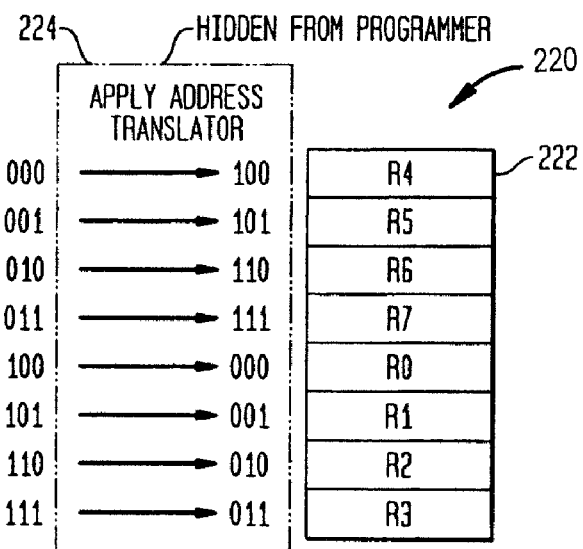
FIG. 2C illustrates a programmer's view of a register tile using address translation as depicted in FIG. 2B in accordance with the present invention.

In another view of this translation, FIG. 2C illustrates a programmer's view 220 of the register file 222 using address translation as depicted in FIG. 2B in which the address translator function 224 is hidden from the programmer. The programmer deals with register names and therefore the translation can be viewed from the programmers vantage as having the effect of a block-exchange of four registers per block while in actuality only the addresses used to access the data have been modified to cause the exchange without any physical data movement. From the programmer's view, after translation, the addressable order of registers can be accessed as shown in register file 222.

Figure 2D:
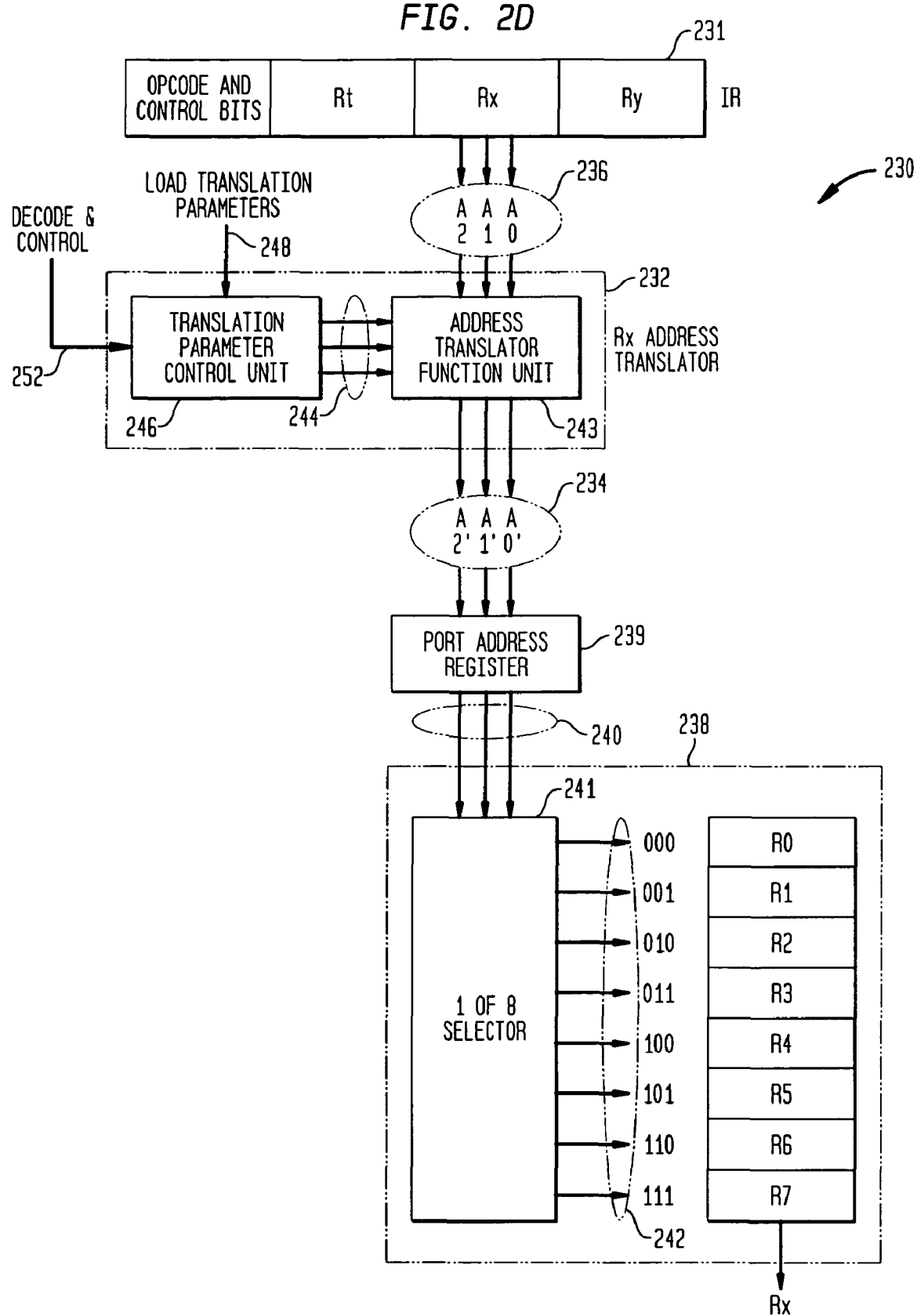
FIG. 2D illustrates a processor subsystem having a Rx read port translator for translating instruction operand addresses to different addresses for reading addressable data from a register tile in accordance with the present invention.

FIG. 2D illustrates a processor subsystem 230 having a Rx read port translator 232 for translating instruction operand addresses to different addresses for reading addressable data from a register file 238. The processor subsystem 230 includes instruction register IR 231, an address translator 232, operating in one operand address bus 236, port address register 239, and a register file 238. The address translator 232 receives as input the Rx address bus 236 from the instruction in the IR 231, a control input 252 from a decode and control unit, such as decode and control unit 118 of FIG. 1, and a load transition parameter input 248 for specifying the translator operations. The translator 232 generates translated outputs A0', A1', and A2' 234 which are latched at the end of a decode stage in port address register 239. The port address register 239 is directly connected to the Rx read address port 240 of the register file 238, where, for example, a 1 of 8 selector 241 decodes the binary input into one of eight selection signals 242. An address translator function unit 243 is one of the components making up the Rx address translator 232. Combinatorial logic, for example, that implement a translation operation, is located in the address translator function unit 243. Since it is desirable to support a number of translation operations, a control input 244 is used to select a translation operation from a supported number of translation operations. The values placed on the control input 244 are provided by a translation parameter control unit 246 which receives translation parameters 248 from a number of sources including, for example, from a bit field in an instruction stored in the instruction register (IR) 231, such as an opcode or specific control bits, or from a data path connected to a control register and decodes the control bits if they are in an encoded format. The translation parameter control unit 246 may also receive decode and control information 252 indicating, for example, whether an instruction is to use or not use the address translation function.

Since there may be a need for a number of different translations, a mechanism to select among multiple translation options may be advantageously provided. There are multiple mechanisms for making such a selection. One mechanism is to use a mode control bit or bits to specify that selected addresses are to be translated according to the setting of the mode control for every instruction received while the mode control is active for translation. A preferable approach is to utilize control information in an instruction to control the translation of the addresses associated with the instruction and only for that instruction. Each instruction contains control information specifying the translation operation to be used for its execution.

Figure 3:
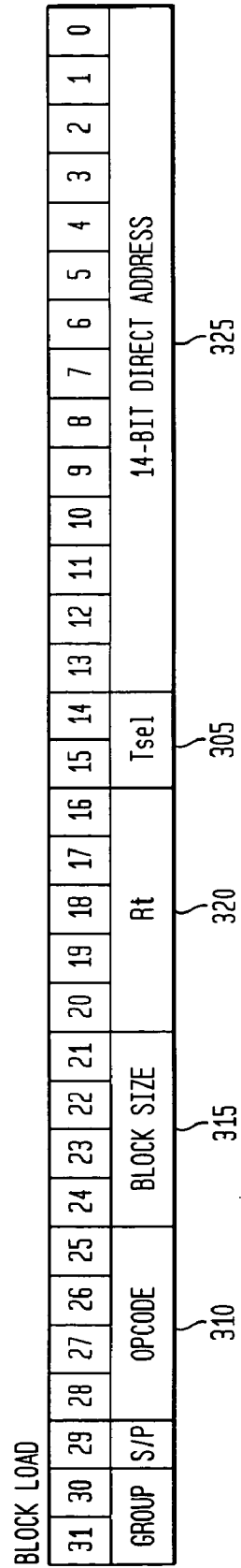
FIG. 3 illustrates an exemplary block load with address translation instruction for use in conjunction with address translators in accordance with the present invention.

FIG. 3 shows an exemplary block load with address translation instruction 300 for use in conjunction with address translators. The exemplary block load instruction 300 uses a format having a two bit translation selection (Tsel) field 305. The two bit Tsel field 305 specifies either a no-translation option or one of three translation choices. One of these choices may be to load a linear sequential ordering of data from a memory into a bit-reverse address pattern in a register file. A second choice may be to begin with a bit-reverse address sequence of data in memory and load it into a linear sequential ordering of data in a register file. For example, a block load operation can be specified by an instruction 300, in opcode 310, for which loading a block of up to 16 data items can be specified by encoding a block size in block size field 315, with the target block of data beginning at Rt address 320, in a register file, such as register file 110. The block of data is to be loaded from a linear sequence of data located in a local data memory, such as data memory 124, beginning at the address specified in the direct address field 325, with Tsel field 305 being set for bit-reverse loads to the register file.

Although only a limited number of address translation patterns have been presented thus far, the present invention contemplates mechanisms that support many translation patterns. A general way of specifying a pattern transformation is through a binary matrix where input translation parameter bits and input address bits are logically combined to produce a translated address. The translation parameter bits may be stored in a program loadable control register. For example, equation (1) below can be used to specify a permutation of an address using translation parameters {s, e} bits stored in a special purpose control register.

$$\begin{pmatrix} A0' \\ A1' \\ A2' \end{pmatrix} = \begin{pmatrix} s0 & s1 & s2 & e0 \\ s3 & s4 & s5 & e1 \\ s6 & s7 & s8 & e2 \end{pmatrix} \times \begin{pmatrix} A0 \\ A1 \\ A2 \\ 1 \end{pmatrix} \quad (1)$$

where the input address is represented as a vector of binary bits A=(A0 A1 A2), product operations are treated as ANDs, and sum operations are treated as XORs.

Using equation (1), the translated output address is given as:

A0'=s0A0⊕s1A1⊕s2A2⊕e0

A1'=s3A0⊕s4A1⊕s5A2⊕e1

A2'=s6A0⊕s7A1⊕s8A2⊕e2   (2)

For example, to obtain a bit-reversed 3-bit address the {s, e} bit matrix would be as shown in {s, e} Matrix 1 below:

$$s0 = 0 \quad s1 = 0 \quad s2 = 1 \quad e0 = 0 \qquad \text{Matrix 1}$$
$$s3 = 0 \quad s4 = 1 \quad s5 = 0 \quad e1 = 0$$
$$s6 = 1 \quad s7 = 0 \quad s8 = 0 \quad e2 = 0$$

For implementation, a set of nine s-bits, s0-s8, and three e-bits, e0-e2, can be stored in a single 12-bit control register whose outputs are logically combined with the address lines according to equation (2).

In another example, to shift a block of data as shown in FIG. 2C, the {s, e} bit matrix would be as shown in {s, e} Matrix 2 below:

$$\begin{pmatrix} 1 & 0 & 0 & 0 \\ 0 & 1 & 0 & 0 \\ 0 & 0 & 1 & 1 \end{pmatrix} \quad \text{Matrix 2}$$

By using an {s, e} matrix of parameters, general and larger register files can be easily accommodated. For example, a 32 entry register file, such as register file 110, would utilize five address lines A0-A4 for each read and write port and would further require a 5×6 translation {s, e} matrix for each address translator, such as address translators 139, 153 and 151 of FIG. 1. Each translation {s, e} matrix requires 25-bits of storage for the 5×5 s-bits and 5 bits of storage for the 5 e-bits thereby requiring a 30-bit control register containing the s and e hits. In general, translation parameters are k by k s-bits and k e-bits for a k-bit address as shown in equation (3).

$$\begin{pmatrix} A0' \\ A1' \\ \vdots \\ A(k-1)' \end{pmatrix} = \begin{pmatrix} s0 & s1 & \cdots & s(k-1) & e0 \\ sk & s(k+1) & \cdots & s(2k-1) & e1 \\ \vdots & \vdots & \vdots & \vdots & \vdots \\ s(k-1)k & s(k-1)k+1 & \cdots & s(k-1)(k+1) & e(k-1) \end{pmatrix} \times \begin{pmatrix} A0 \\ A1 \\ \vdots \\ A(k-1) \\ 1 \end{pmatrix} \quad (3)$$

A selection field in the instruction, such as the 2-bit Tsel field 305, can specify one of a number of {s, e} bit control registers previously loaded with translation pattern bits.

Figure 4:
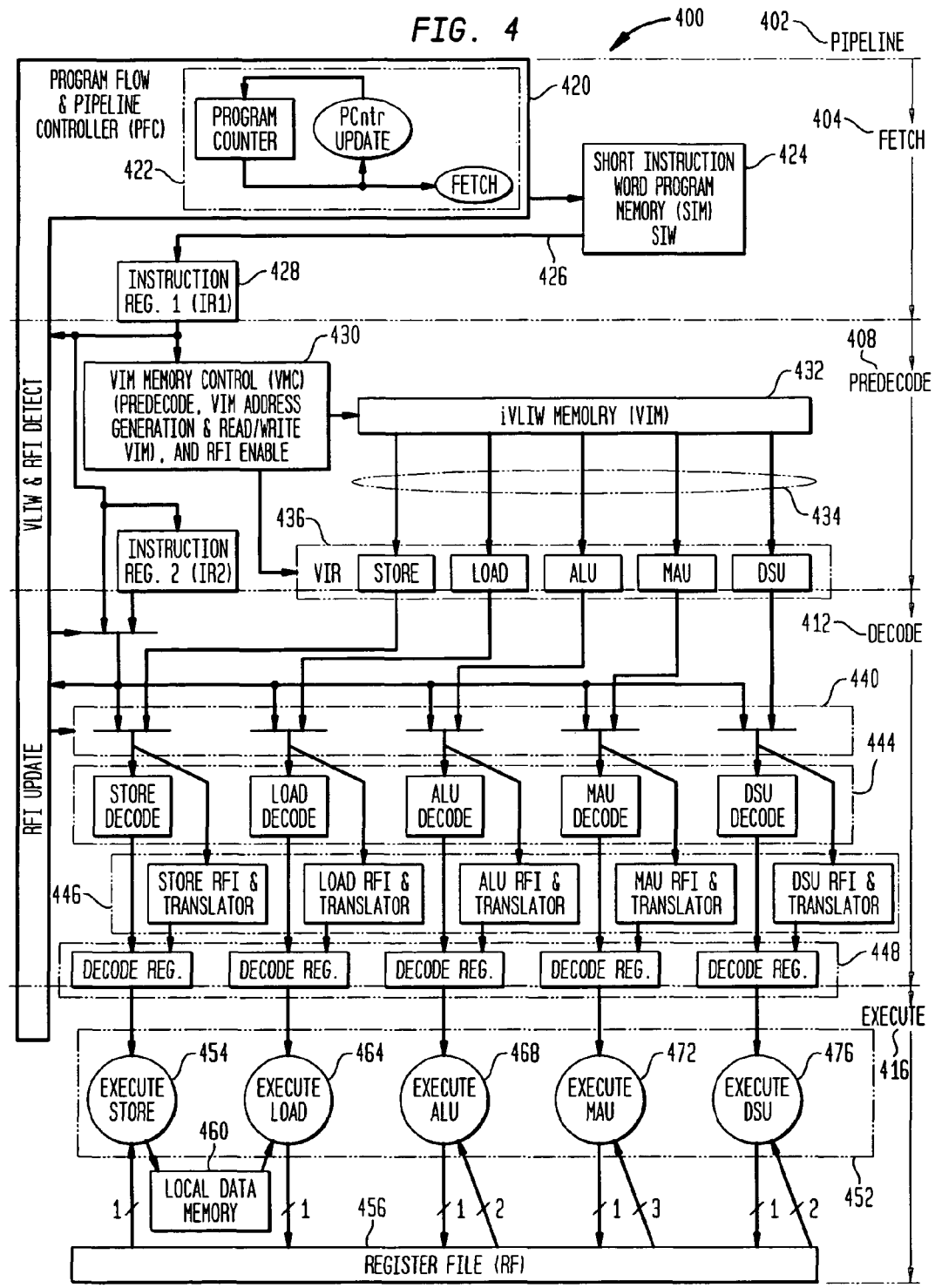
FIG. 4 illustrates an exemplary register file indexing (RFI) VLIW processor with address translation functions in each VLIW execution slot and further illustrating an exemplary four stage pipeline in accordance with the present invention.

Vector operations are typically specified by a single instruction that initiates a series of operations on a set of data, such as the block load example discussed previously which can be considered a form of vector operation. A different mechanism may be utilized to obtain vector operations that are operable in conjunction with indirect very long instruction word (iVLIW) operations. For example, the approach described in U.S. Pat. No. 6,446,190, incorporated by reference herein in its entirety, utilizes an indirect method of specifying the vector operations termed register file indexing (RFI). In the RFI approach, operands are accessed from a register file with a linear sequential programmable stride incrementing mechanism. This approach may be adapted to the present invention as illustrated in FIG. 4. FIG. 4 illustrates an exemplary register file indexing (RFI) VLIW processor 400 with address translation functions in each VLIW execution slot and further illustrating an exemplary four stage pipeline 402. The four stage pipeline 402, includes fetch stage 404, predecode stage 408, decode stage 412, and execute stage 416. Note that other pipelines are not precluded, such as the dynamic reconfigurable pipeline of the ManArray processor which for VLIW processing used a five or six stage pipeline including a fetch stage, predecode stage, decode stage, a single cycle execute stage or a two cycle execute stage, and a condition return stage.

During fetch stage 404, the program flow and pipeline controller (PFC) 420 initiates an instruction fetch cycle using an address from the program counter (PCntr) circuit 422. The generated instruction address is supplied to a short instruction word (SIW) program memory (SIM) 424 and a SIW is read which is supplied to instruction memory bus 426 to the instruction register 1 (IR1) 428. At the end of the fetch cycle 404 a new instruction has been loaded into the IR1 428.

In the predecode stage for VLIW accesses, the instruction in IR1 428, for example being an execute VLIW (XV) instruction, causes VLIW memory (VIM) controller (VMC) 430 to generate a VIM 432 address and read a VLIW supplied to VLIW bus 434 for loading into a VLIW instruction register (VIR) 436. The VIR 436 consists of, for example, five instruction slot registers for a store, load, arithmetic logic unit (ALU), multiply accumulate unit (MAU), and data select unit (DSU) instructions. At the end of the predecode cycle for VLIW access, a new VLIW has been loaded into the VIR 436. RFI enable is determined if the XV instruction encoding specifies RFI and also if subsequent RFI enabled XV instructions access the same Vim 432 address.

During the decode stage for VLIW accesses, the VLIW from the VIR 436 is selected by the multiplexers 440 to five instruction decode units 444 where each instruction of the VLIW is decoded. The operand addresses for each of the five instructions are processed by a VLIW RFI and Translator subsystem 446 which processes each instruction slot individually in slot specific RFI and Translator subsystems which are more fully described in the discussion of FIGS. 5 and 6 below. The decoded instructions and modified operand addresses are then stored in five decode registers 448 by the end of the decode stage.

In the execute stage for VLIW accesses, the decoded and enabled instructions are executed in five execute units 452. Execute store unit 454 reads a specified register from the register file 456 and stores it into a local data memory 460. Execute load unit 464 reads a memory location from the local data memory 460 and loads it into register file 456. Execute ALU 468 reads up to two operands from register file 456, operates on the two operands, and produces a result that is stored in register file 456. Execute MAU 472 reads up to three operands from register file 456, operates on the three operands, and produces a result that is stored in register file 456. Execute DSU 476 reads up to two operands from register file 456, operates on the two operands, and produces a result that is stored in register file 456. At the end of the execute stage up to five execution operations have been completed.

Figure 5:
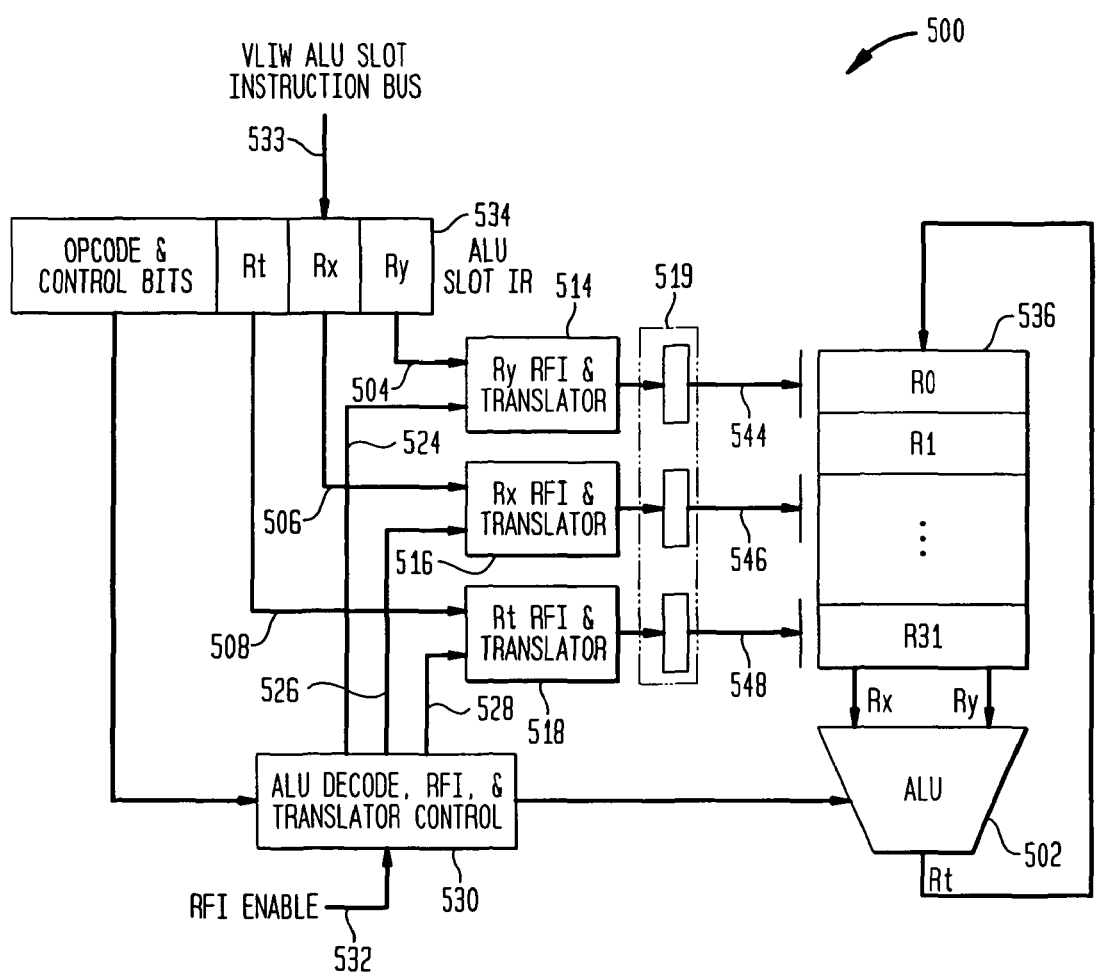
FIG. 5 illustrates an ALU subsystem of the RFI VLIW processor of FIG. 4 with address translation functions in each operand address in accordance with the present invention.

FIG. 5 shows an ALU subsystem 500 of the RFI VLIW processor 400 of FIG. 4 with address translation functions in each operand address. The ALU subsystem 500 includes an ALU execution unit 502, such as Execute ALU 468 that is part of a larger multiple execution unit VLIW processor system. In FIG. 5, each operand address 504, 506 and 508 is received in a corresponding RFI and translator unit 514, 516 and 518, respectively. The RFI and translator units 514, 516 and 518 also receive update control information 524, 526 and 528 from an ALU decode, RFI, and translator control unit 530. The RFI and translator units 514, 516, and 518 outputs are stored in port address registers 519 at the end of the decode pipeline stage, such as decode stage 412. The ALU decode, RFI and translator control unit 530 responds to an RFI enable signal 532 generated in a VMC, such as VMC 430, in response to received execute VLIW (XV) instructions containing RFI control information. The XV instruction initiates an RFI VLIW execution by reading a VLIW from VIM 432. The VLIW includes an ALU instruction, received on VLIW ALU slot instruction bus 533, part of VLIW bus 434, and the ALU instruction is stored in ALU slot IR 534, part of the VIR 436. For illustrative purposes, the unit 530 includes internal RFI parameter and translator control registers. The registers are programmed to initialize the system for RFI operation, translator operation, or both. It is appreciated that the RFI and translator parameter control registers may be part of a general processor control register file located elsewhere in the processor. Independent of the location of the control registers, the parameter control bits are used in the RFI and translator units, 514, 516, and 518. A vector RFI operation uses the instruction operand addresses 504, 506 and 508 supplied by the instruction in slot IR 534 for the first access of operands from a block of operands in register file 536 through address ports 544, 546 and 548. The RFI addresses may be translated depending upon the slot instruction received.

Figure 6:
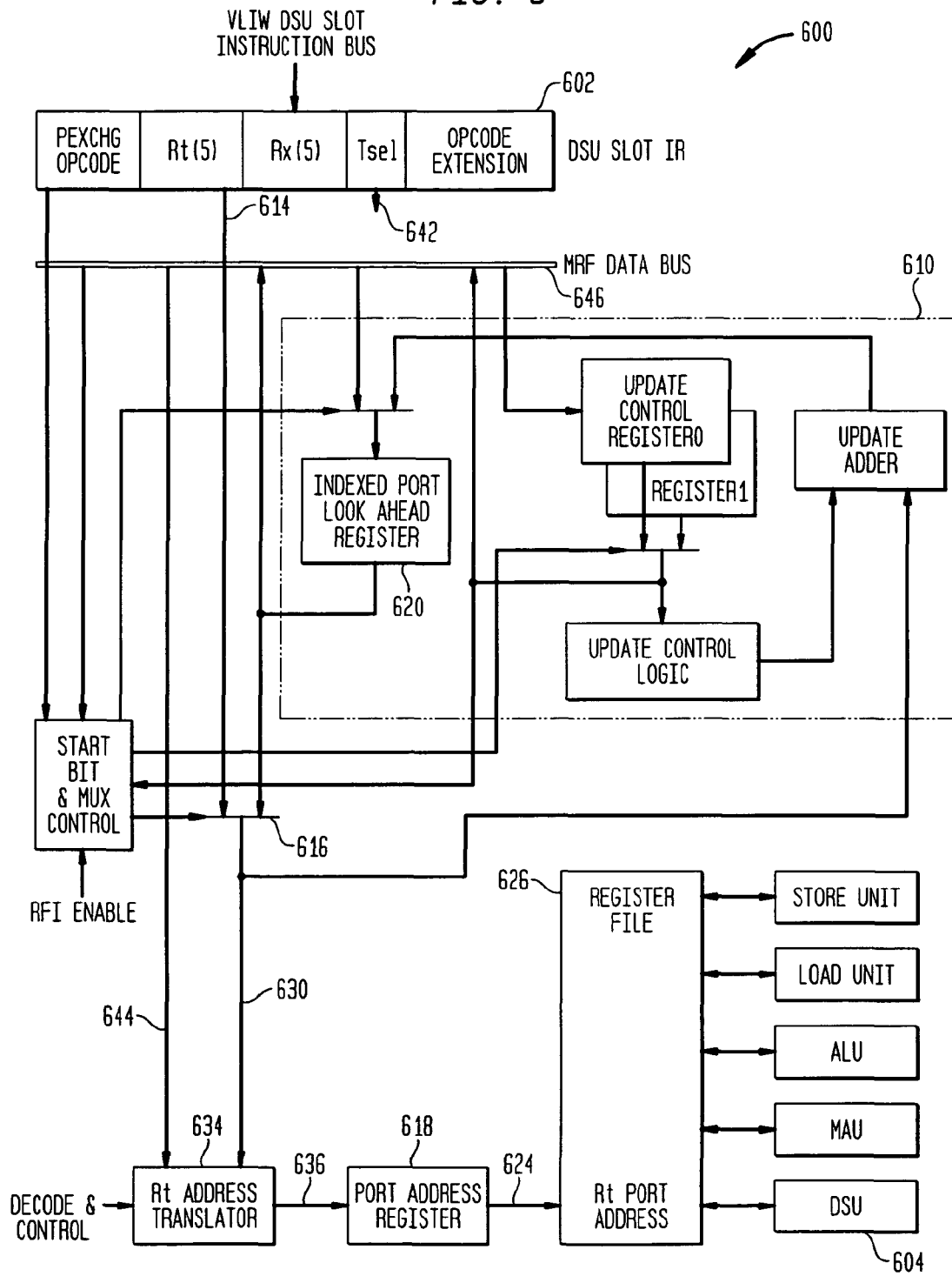
FIG. 6 illustrates a detailed view of RFI update logic for the Rt register file address including an address translator of a DSU subsystem in accordance with the present invention.

To further explain such RFI operation and RFi with address translation, a more detailed view of RFI update logic for the Rt register file address including address translator of a DSU subsystem is shown in FIG. 6 and more fully described below. The exemplary pipeline 402 is used to present the basic flow of vector RFI operations. It is noted that this choice of pipeline does not preclude the use of other pipelines, such as deeper pipelines for higher clock performance, and the like which can be adapted for providing address translation operations in accordance with the present invention. The pipeline 402 begins with a fetch of an XV instruction from SIM 424 and loaded into IR1 428. During the predecode stage 408 the operation of the XV instruction and RFI operation is determined, a VLIW is fetched from the VIM 432, and each instruction from the VLIW is loaded into its own instruction register, such as DSU slot IR 602, associated with its execution unit, such as execution unit 604. During the decode stage 412, each instruction in the VLIW is decoded. In the case of RFI operations, the operand address is updated via an RFI update unit 610 to prepare the next operand address that will be required for a RFI operation on a block of data. An update process, as described in greater detail in U.S. Pat. No. 6,446,190, utilizes a linear sequential addressing of data, with stride address incrementing available as an option. The operand addresses with no translation for the first register file access of the starting operands for the block of data are passed directly through from the slot instruction register 602 operand address fields, such as Rt(5) field 614, through multiplexer 616 through Rt address translator 634 to a port address register 618 which latches the address at the end of the decode cycle.

When the next XV instruction is received with RFI enabled to access the same VIM 432 location as the previous XV accessed, the next operand address to be processed in the block of data has already been prepared during the previous XV RFI instruction's decode cycle and stored in a look ahead register, such as look ahead register 620. For this next XV instruction, the operand address is selected from the look ahead register 620 via multiplexer 616, through Rt address translator 634 without translation and latched in the port address register 618 at the end of the decode cycle. The operand address 624 is available during the execute cycle to access the operands from the register file 626. A miscellaneous register file (MRF) data bus 646 provides access to a set of registers that store the RFI and translator parameters as well as other processor control and status bits.

It is also desirable to provide a general addressing mechanism where the operands in a block of data may not be in a sequential order. One option for providing this capability is through the use of an address translator, such as described above with respect to equation (1), which can advantageously provide a discrete logic approach to general vector or RFI addressing, where the addressing sequence is non sequential, such as bit reverse addressing, permutation addressing, and other addressing patterns, for example. To this end, in FIG. 6, address translator 634 is placed in output path 630 of multiplexer 616. The Rt address translator 634 output 636 is connected to a port address register 618 whose output connects to the Rt address port 624 of register file 626. This subsystem 600 uses an RFI update unit 610 to create a linear sequential stream of addresses using programmed stride increment values. This sequential stream of addresses provided through multiplexer 616 on output bus 630, applied to the Rt address translator 634 for each translation type instruction, is translated to a desired address sequence and output on translator bus 636. An instruction, such as the instruction stored in DSU slot IR 602 may contain a Tsel bit field 642 which is used to select a specific set of {s, e} bits that are provided on RFI and translator parameter bus 644 from the MRF data bus 646 where the RFI and translator parameters are accessed, in this example. With multiple pattern select control provided by the {s, e} bits, different addressing patterns may be chosen.

Figure 7A:
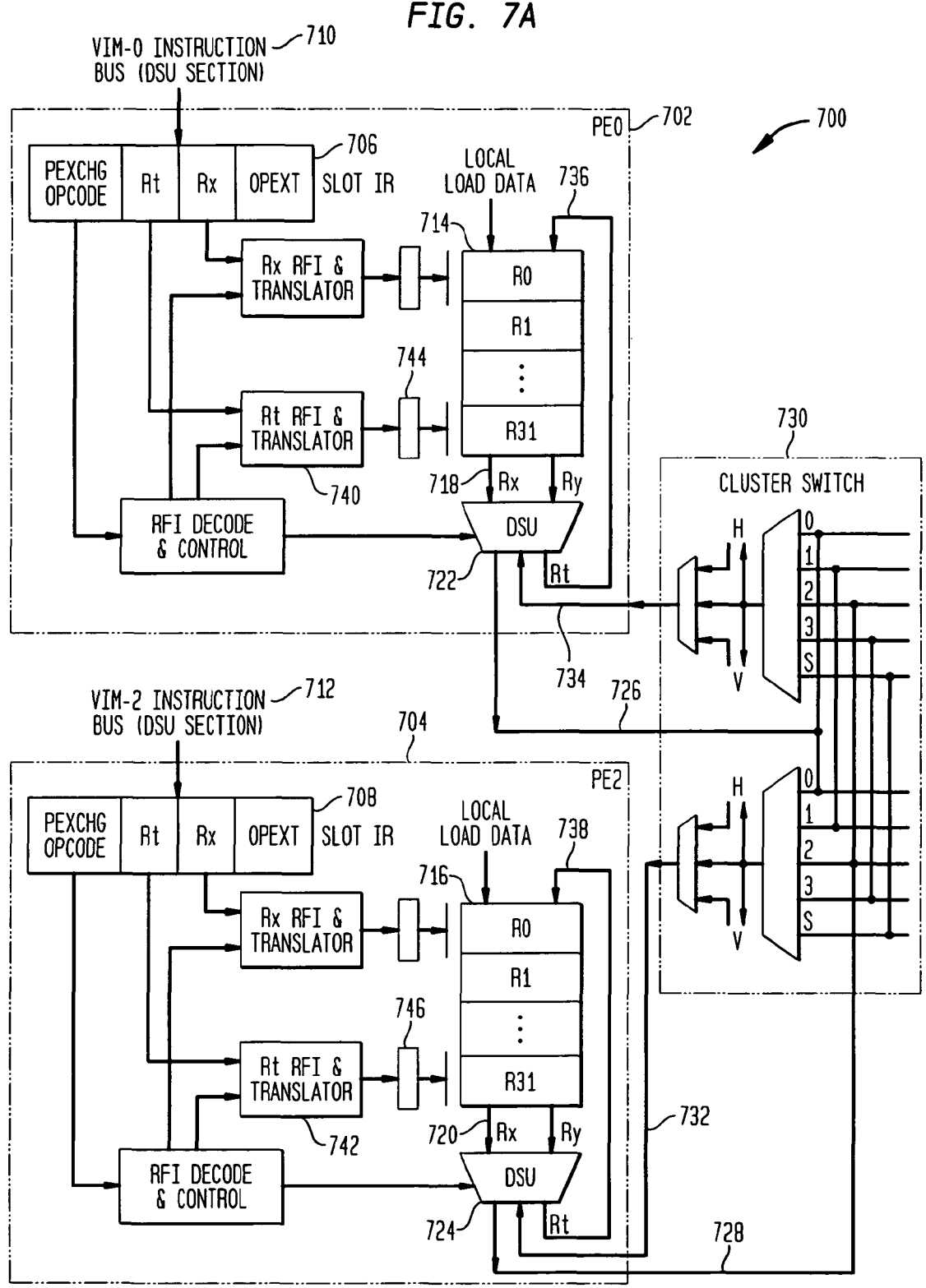
FIG. 7A illustrates a two processing element (PE) subsystem from a ManArray 2×2 indirect very long instruction word (iVLIW) processor incorporating RFI and address translators in register file operand address paths in accordance with the present invention.
Figure 7B:
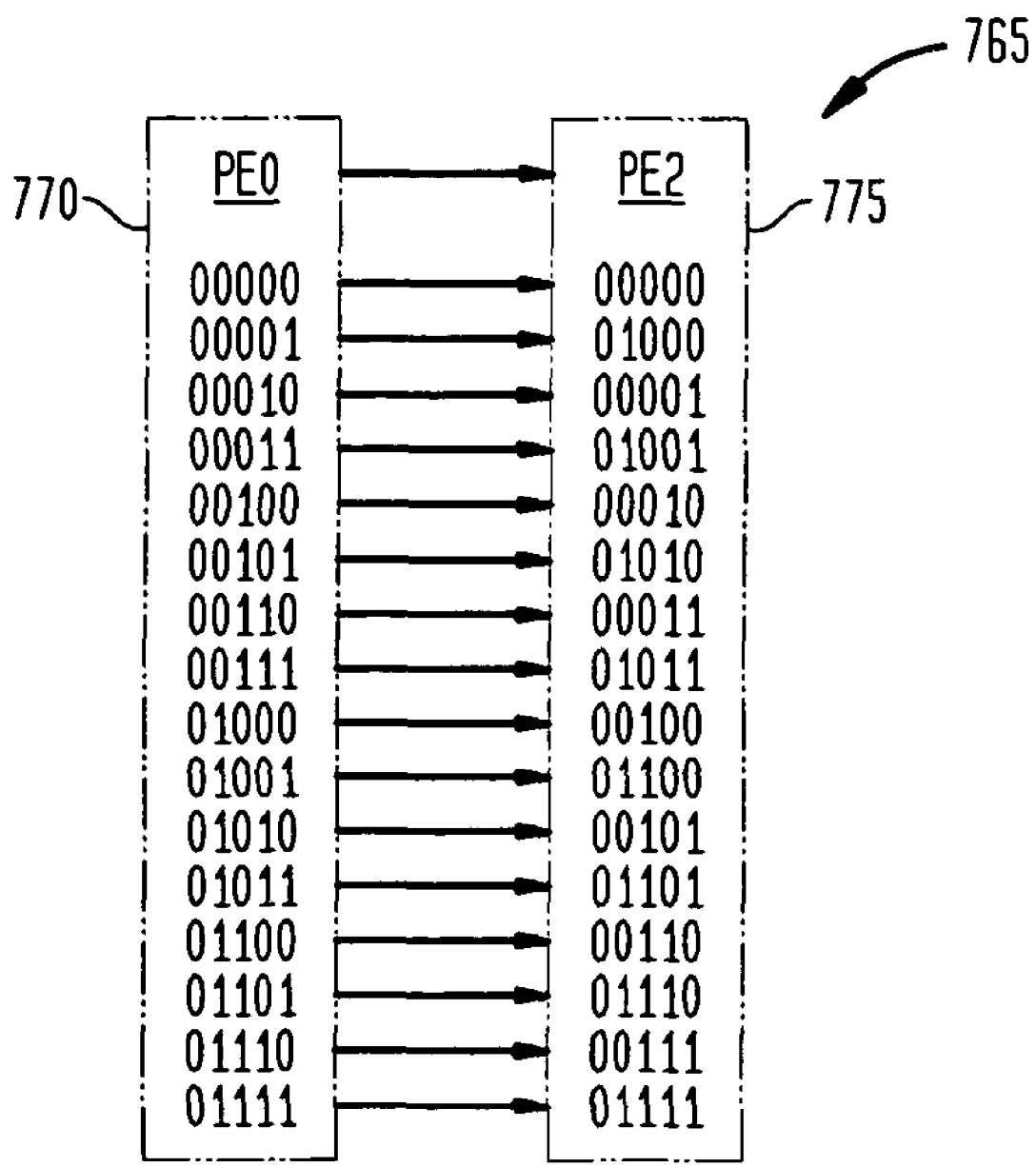
FIG. 7B is a table illustrating an address translation pattern used in a data movement example for the processor of FIG. 7A in accordance with the present invention.

A two processing element (PE) subsystem 700 from a ManArray 2×2 indirect very long instruction word (iVLIW) processor incorporating RFI and address translators in register file operand address paths is shown in FIG. 7A. In SIMD fashion, it is desired to transfer between the two PEs, PE0 702 and PE2 704, two blocks of data stored in the PEs' register files 714 and 716. Both data blocks are stored in a sequential pattern in the register files of the PEs, but it is desired to send the blocks between the two PEs and place all even addresses in one block and all odd addresses in a different block according to the pattern shown in Table 765 of FIG. 7B, for a block size of 16 locations. A first block of data, addressed as shown in table 770, is stored in sequential addresses 00000 to 01111 in PE0 702 and this data is to be sent to PE2 704 with the target being two blocks of data, with the even addresses of the first PE0 block stored in PE2 locations 00000 to 00111 and the odd addresses of the first PE0 block stored in PE2 locations 01000 to 01111, as shown in table 775. The same transfer is to occur in the reverse direction between PE2 704 and PE0 702 at the same time. The address transformation equations for the five-bit Rt address RtA0-RtA4, based on using equation (3) with k=5, are shown in equation (4):

$$RtA0'=s0RtA0 \oplus s1RtA1 \oplus s2RtA2 \oplus s3RtA3 \oplus s4RtA4 \oplus e0$$
$$RtA1'=s5RtA0 \oplus s6RtA1 \oplus s7RtA2 \oplus s8RtA3 \oplus s9RtA4 \oplus e1$$
$$RtA2'=s10RtA0 \oplus s11RtA1 \oplus s12RtA2 \oplus s13RtA3 \oplus s14RtA4 \oplus e2$$
$$RtA3'=s15RtA0 \oplus s16RtA1 \oplus s17RtA2 \oplus s18RtA3 \oplus s19RtA4 \oplus e3$$
$$RtA4'=s20RtA0 \oplus s21RtA1 \oplus s22RtA2 \oplus s23RtA3 \oplus s24RtA4 \oplus e4 \quad (4)$$

The {s, e} bits required to obtain the Table 1 765 transformation are shown in Matrix 3:

$$\begin{pmatrix} s0 & s1 & s2 & s3 & s4 & e0 \\ s5 & s6 & s7 & s8 & s9 & e1 \\ s10 & s11 & s12 & s13 & s14 & e2 \\ s15 & s16 & s17 & s18 & s19 & e3 \\ s20 & s21 & s22 & s23 & s24 & e4 \end{pmatrix} = \begin{pmatrix} 0 & 1 & 0 & 0 & 0 & 0 \\ 0 & 0 & 1 & 0 & 0 & 0 \\ 0 & 0 & 0 & 1 & 0 & 0 \\ 1 & 0 & 0 & 0 & 0 & 0 \\ 0 & 0 & 0 & 0 & 1 & 0 \end{pmatrix} \quad \text{Matrix 3}$$

The {s, e} bits are loaded into parameter registers that control the address transformation within the Rt address RFI and translator and units 740 and 742. The Rt address RFI and translator and units 740 and 742 connect to the Rt port address registers 744 and 746 respectively, such as port address register 618 of FIG. 6. The {s, e} parameter bits may be stored in registers located with the RFI parameter registers, such as in the MRF. If path delay is of concern, it is noted that equation (4) can be simplified using standard techniques which is not covered here since equivalent equations and their implementation can be generated using various types of logic gates and this may vary depending upon the processor cycle time and process technology chosen.

Referring to FIG. 7A, the block move with address translation operation begins with an RFI enabled XV which causes PE exchange (PEXCHG) instructions to be fetched from the local PEs' VIM over local instruction buses 710 and 712 and then latched in slot IR 706 and slot IR 708. The Rx operands of the instructions are not translated, and standard sequential addressing is used to read the data operands in each PE. With each RFI XV for this block move operation, each data operand is sequentially read from register files 714 and 716 over the Rx read output ports 718 and 720 to the DSUs 722 and 724, respectively. The DSUs 722 and 724 make the data available on the data paths 726 and 728, respectively, to a cluster switch 730. Each PE controls its portion of the cluster switch so that PE0's output path 726 is connected via the cluster switch multiplexers to PE2 DSU input path 732, and PE2's output path 728 is connected via the cluster switch multiplexers to PE0's DSU input path 734. The DSUs connect via internal multiplexers the cluster switch input paths to the Rt output paths 736 and 738. The Rt addressing for the data transferred is generated by the Rt address translators 740 and 742 which transform the sequential addresses output from a multiplexer associated with an RFI update unit, such as multiplexer 616 and RFI update unit 610 of FIG. 6, according to the {s, e} bits of Matrix 3. This block move operation continues with each RFI enabled XV received until all 16 data elements are moved.

Figure 8A:
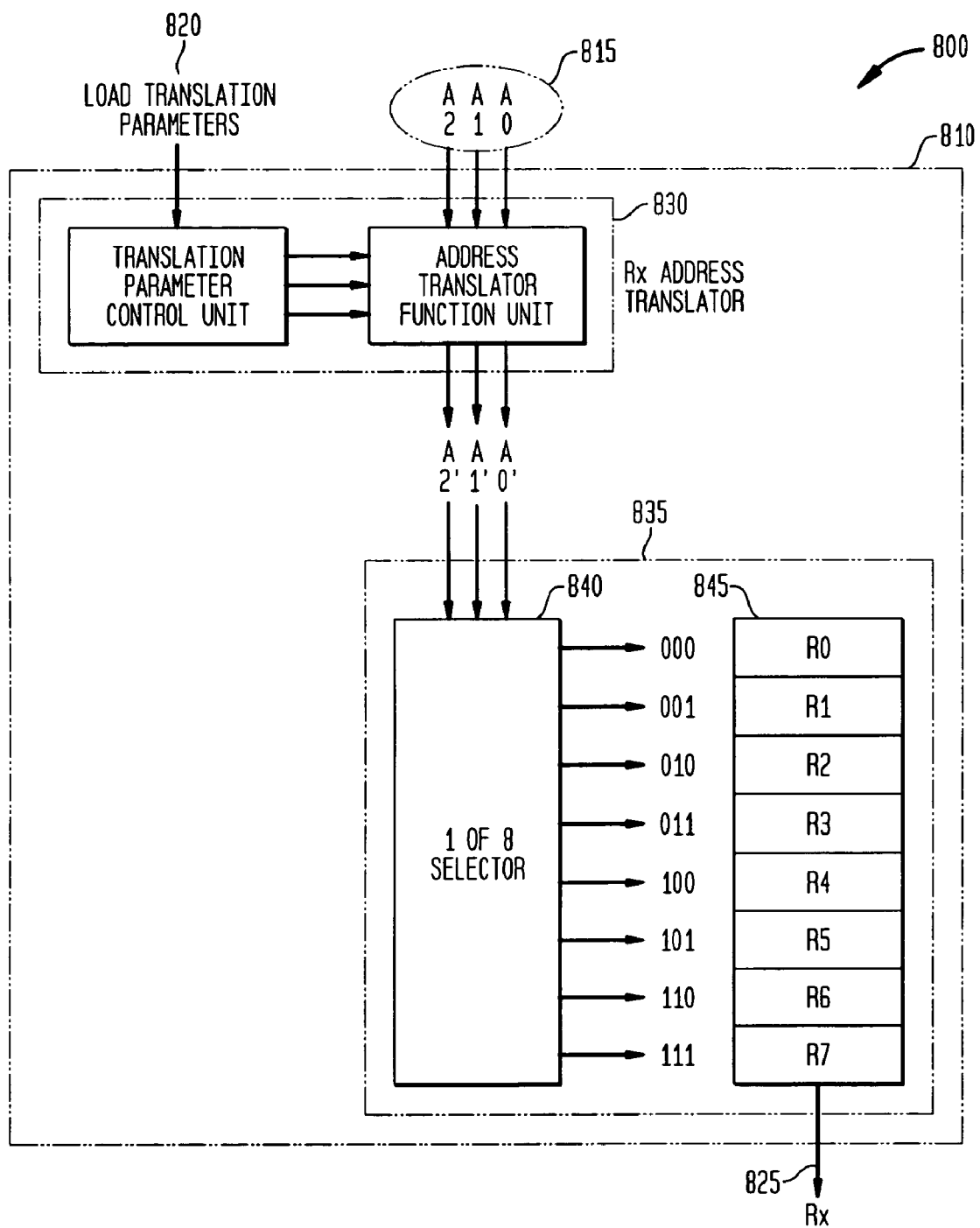
FIG. 8A illustrates an exemplary register file or memory unit incorporating the address translation function and translation parameter state internally with a view of a read port in accordance with the present invention.

Another aspect of the present invention, is achieved by including the address translator in the register file or memory unit thereby creating a storage unit a programmer would view as a pool of register or memory locations that can be manipulated by operations on storage unit addresses. Consider an exemplary storage subsystem 800 of FIG. 8A, illustrating aspects of a read port, which operates differently than the storage subsystem 238 shown in FIG. 2D. In FIG. 8A, if the storage unit 810 is used as a register file for example, the address translation {s, e} bits would be considered architectural state information of the storage subsystem and the address translation is considered to be operative for each instructions accessed, as indicated by the {s, e} bits. In FIG. 2D subsystem 230, the address translation occurs only in operation for instructions that specify the address translation function. Other instructions, which don't specify an address translation function, use the register file or memory unit normally as sequentially addressed storage. In the storage subsystem 800 of FIG. 8A, all address inputs 815 are translated according to the translation settings 820 that govern how the addresses access data from the storage unit-device 835. It is noted that port address latches may be included internal to the storage unit 810 at the outputs of the address translators or external depending upon application.

The storage subsystem 800 includes a storage unit 810, showing only a read port path, with address inputs 815, a load translation parameter input 820 and read port output Rx 825. Timing and control signals are not shown, as they may vary depending upon the technology chosen for implementation and system design choices. Internal to the storage unit 810 are two basic units, the address translator 830 and a storage device 835. The address translator 830 applies {s, e} bit state information to translate the address input for any access to the storage device 835. It is noted that the {s, e} bit state information could be stored external to the storage subsystem 800 with separate signal lines provided to the storage subsystem from an external register without changing the operational characteristics of the storage subsystem. The {s, e} bit state information, whether locally maintained in an internal register or externally maintained in a separate register, is considered part of the storage subsystem. The translation function operates as previously described using the examples shown in equation (2) and equation (4), depending upon the number of address lines to be translated. The storage device 835 includes an address to location select device, such as a 1 of 8 selector 840, and a storage array 845 containing the data. It is noted that a write port to the storage array would contain a similar address translator and require the same or a corresponding set of {s, e} bit translation parameter state information.

Figure 8B:
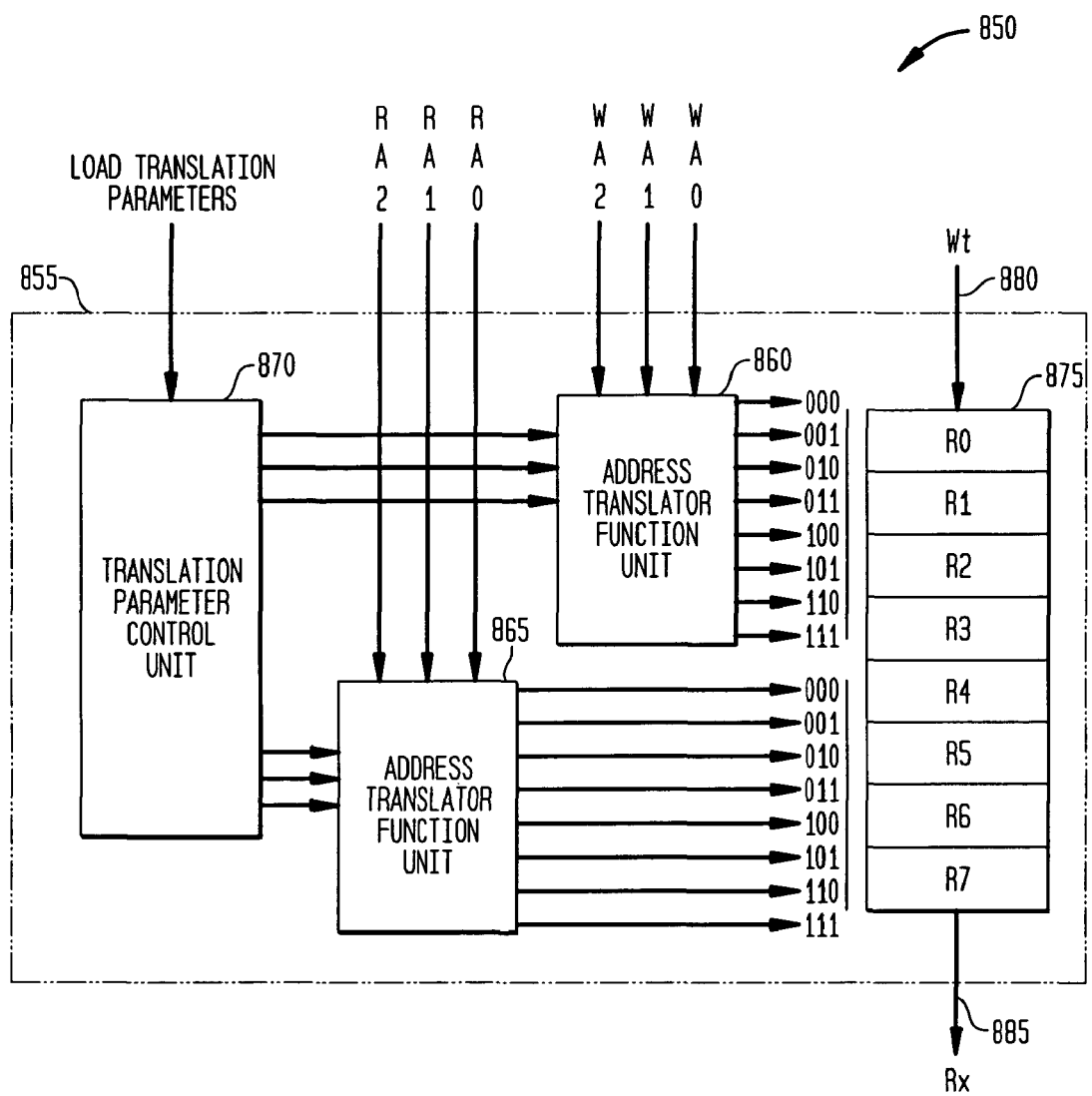
FIG. 8B illustrates a storage unit with an optimized merging of an address translation function with location selection logic in each port of a two port storage unit in accordance with the present invention.

The read port was used in FIG. 8A to focus on address translation functions and apparatus that could similarly be required on any read or write port to the storage subsystem. FIG. 8B illustrates a 2 port storage subsystem 850 in which a storage unit 855 comprises two address translator function units 860 and 865, a transform parameter control unit 870 for holding the {s, e} bit state information, and a storage array 875. A write data port 880 supplies data to be written at the specified translated address in the storage array 875 and a read data port 885 reads data from the specified translated address in the storage array 875. The address translation function units 860 and 865 are merged with the location selection logic, such as the 1 of 8 selector 840 of FIG. 8A, providing an optimization of an implementation. It is further noted that the location selection logic could use Gray encoding or other suitable encoding of the address lines rather than using a sequential binary ordering as shown in FIG. 8B. This encoding choice is dependent upon optimization and functional requirements.

Referring to the address translation function of moving a block of data described earlier and illustrated in FIGS. 2A-2D, in using the address translating memory, the operation of moving the data is emulated by the loading of the appropriate {s, e} bits that affect the address translators' operations. For the block move operation, the data does not move in the storage device as only the addressing mechanism is changed. To accomplish the swapping of four 32-bit registers in a processor without a swap instruction, would require reading the first block of four registers and storing them in a temporary set of four registers followed by the reading of the second set of four registers and storing them into the first set of four registers' location then reading the four temporary registers and storing them into the second set of registers' location. A total of twelve 32-bit read operations and twelve 32-bit write operations would be required and would take at least 12-cycles to accomplish. On a bit basis, 12×32, or 384 bits, would have to be read and 384 bits would have to be written to accomplish this operation. Using the techniques of the present invention, the whole operation can be accomplished in a single cycle and with no movement of the data, and only requiring the loading of 9 s-bits and 3 e-bits as per equation (2), thus demonstrating the effectiveness of the present techniques for low power and high performance. A storage device in accordance with the present invention may have a new input, the load translation parameter signals, as compared to existing storage devices such as register files and memories. In addition to data stored in the storage array, the address translation control registers are considered additional state that, for example, must be saved and restored on context switches.

Figure 9:
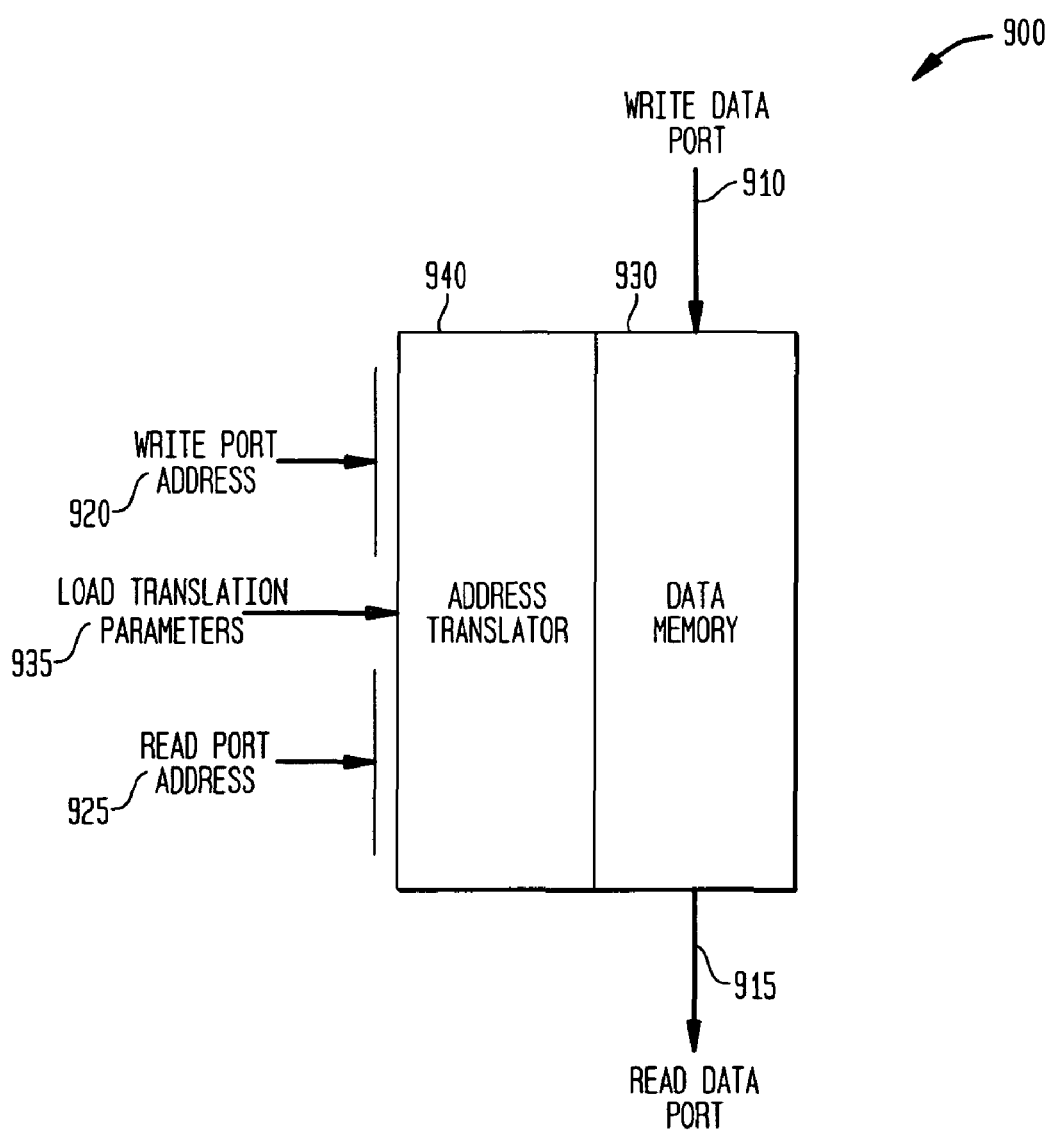
FIG. 9 illustrates a general form of a two port storage unit illustrating the data flow paths in accordance with the present invention.

FIG. 9 illustrates a two port memory unit 900 including a write data port 910 and a read data port 915, which may be 1, 4, 8, 9, 16, 32, 64, 128 or other bit width. A write port address 920 and a read port address 925 are each k lines for $2^k$ data memory 930 capacity. A load translation parameters input 935 is used to load k×k+k {s, e} bit translation state information. For example, with a k=10, $2^{10}$=1024 data locations of 64 bit data, and a load translation parameter input path width of 64 bits to the address translator 940, it would require two load cycles to load the 110 {s, e} bits for each address port. A number of variations to reduce the setup loading overhead can be considered such as using common {s, e} bit state information for write and read pairs of ports, having separate e bit load cycles if the e bits do not change between translation patterns, minimizing the number of {s, e} bits when a limited selected set of transformations are used, and the like.

As an example, consider a system that needs to support a transpose operation which is used in various algorithms such as the 2 dimension discrete cosine transform (2D-DCT) and requires other data reorganization steps, such as bit-reversed addressing for FFT algorithms. For this system, a memory 900 shown in FIG. 9 can be used with a capacity, for the purposes of this example, of 32 data locations of a data width required by the application, k=5 and a 32-bit load translation parameters data path 935 is used. The write port data 910 and read port data 915 are of a data width required by the application. For purposes of explanation, assume that a transpose of a 4×4 matrix of 16 data elements is required. The 4×4 data matrix as shown in data Matrix 4 1004 is stored in 16 sequential locations as shown in Table 1008 of FIG. 10A. Specifically, the 4×4 data matrix 4 1004 is sequentially loaded through a write port 910 of FIG. 9 with a write address translation, part of translator 940, configured for sequential addressing, obtaining the sequential addressing order for the data as shown in Table 1008. For this example, the algorithm requires a transpose operation to be performed on the data matrix such that after the transpose operation the data resides in a 4×4 logical order as shown in data Matrix 5 1024 and in memory as shown in Table 1028 of FIG. 10B. To accomplish the transpose operation without data movement, or reading and writing the data in the data memory 930, the read port Rx {s, e} bit address transformation parameters as shown in {s, e} Matrix 6 below are loaded in a 30-bit parameter control register, part of translator 940, and equation (4) is used with {s,e} Matrix 6 for the transpose operation. When data is read, the data will follow the output pattern of Table 1028, which is in transpose order from the order as originally stored. This same memory unit can then be reconfigured by loading new {s, e} bit translation parameters to support, for example, bit-reverse addressing as well as other specified data patterns.

$$\begin{pmatrix} s0 & s1 & s2 & s3 & s4 & e0 \\ s5 & s6 & s7 & s8 & s9 & e1 \\ s10 & s11 & s12 & s13 & s14 & e2 \\ s15 & s16 & s17 & s18 & s19 & e3 \\ s20 & s21 & s22 & s23 & s24 & e4 \end{pmatrix} = \begin{pmatrix} 0 & 0 & 1 & 0 & 0 & 0 \\ 0 & 0 & 0 & 1 & 0 & 0 \\ 1 & 0 & 0 & 0 & 0 & 0 \\ 0 & 1 & 0 & 0 & 0 & 0 \\ 0 & 0 & 0 & 0 & 1 & 0 \end{pmatrix} \quad \text{Matrix 6}$$

While the present invention has been described in the context of a number of presently preferred embodiments, it will be recognized that the teachings of the present invention may be advantageously applied to a variety of processing systems, such as low power and high performances systems, and variously adopted consistent with the claims which follow.

We claim:

1. A storage unit comprising:
   an address translation unit within the storage unit and coupled to an address input of the storage unit, and wherein the address translation unit is configured to translate a storage address received on the address input to a data address according to translation information stored in the storage unit, wherein the storage address is generated external to the storage unit in response to an instruction; and
   a data memory within the storage unit and coupled to the address translation unit, wherein the address translation unit is configured to select data from the data memory at the data address for output, wherein the data stored at the data address is emulated to have moved to the storage address, wherein the translation information for a k bit address is in the form of k by (k+1) bit matrix of parameters that are logically combined with the storage address to generate the data address.

2. The method of claim 1, wherein the translation information is configured for linear sequential address generation.

3. The method of claim 1, wherein the translation information is configured for permutation address generation.

4. The method of claim 1, wherein the storage unit includes a register file unit.

5. The method of claim 1, wherein the storage unit includes storage for a pool of memory locations, and wherein a memory location is selected by translating the storage address.

6. The method of claim 1, wherein the instruction is a load instruction.

7. The storage unit of claim 1, wherein the translation information is a set of program specified bits, and wherein each program specified bit is logically combined with a bit in the storage address according to a specified function to translate the storage address to the data address.

8. The storage unit of claim 1 further comprising:
   a translation parameter control unit located in the storage unit and coupled to the address translation unit, wherein the translation parameter control unit is configured to store the translation information and to provide the translation information to the address translation unit.

9. The storage unit of claim 8 further comprising:
   a load translation parameter input operable to load the translation information for storage in the translation parameter control unit.

* * * * *